United States Patent [19]
Hofmann

[11] Patent Number: 5,385,065
[45] Date of Patent: Jan. 31, 1995

[54] MULTISPEED MANUAL TRANSMISSION FOR MOTOR VEHICLES

[75] Inventor: Harald Hofmann, Cologne, Germany

[73] Assignee: Ford Motor Company, Dearborn, Mich.

[21] Appl. No.: 30,972

[22] Filed: Mar. 12, 1993

[30] Foreign Application Priority Data

Mar. 13, 1992 [DE] Germany .............. 4204989

[51] Int. Cl.⁶ .............................................. F16H 3/08
[52] U.S. Cl. ..................................................... 74/331
[58] Field of Search ........................ 74/331, 325, 329

[56] References Cited

U.S. PATENT DOCUMENTS

| | | | |
|---|---|---|---|
| 4,738,149 | 4/1988 | Janiszewski | 74/331 X |
| 4,776,227 | 10/1988 | Janiszewski | |
| 4,799,399 | 1/1989 | Bruce | 74/331 X |
| 4,802,373 | 2/1989 | Saint-Jean et al. | 74/331 X |
| 5,031,473 | 7/1991 | Yumoto et al. | 74/331 X |
| 5,199,316 | 4/1993 | Hofmann | 74/331 X |

FOREIGN PATENT DOCUMENTS

| | | |
|---|---|---|
| 0224407 | 10/1985 | France . |
| 3320494 | 6/1983 | Germany . |
| 2074669A | 4/1981 | United Kingdom . |

*Primary Examiner*—Dirk Wright
*Attorney, Agent, or Firm*—Frank G. McKenzie; Roger L. May

[57] ABSTRACT

A multispeed transmission for motor vehicles includes, rotatably mounted in a gearbox housing (4), an input shaft (1) carrying fixed gear wheels and loose gear wheels, a first driven shaft (2) carrying loose gear wheels and fixed gear wheels and a second driven shaft (3), both the driven shafts (2 and 3) engaging, respectively, via first and second fixed final drive pinion (5 and 6), with a driving gear (7) of a differential (8) that drives front wheel drive shafts by way of constant velocity joints. All gears including the reverse gear are synchronized. The fixed gear wheels (10 and 12) for the first and second gears are carried on the input shaft (1). The loose gear wheels (11 and 13) for the first and second gears, together with their associated synchronizer (21), are carried on the first driven shaft (2). The second driven shaft (3) carries a loose gear wheel (20) for the reverse gear with a single-acting synchronizer (24), meshing with the loose gear wheels (11 or 13) of the first or second gear ratios carried on the first driven shaft (2).

8 Claims, 3 Drawing Sheets

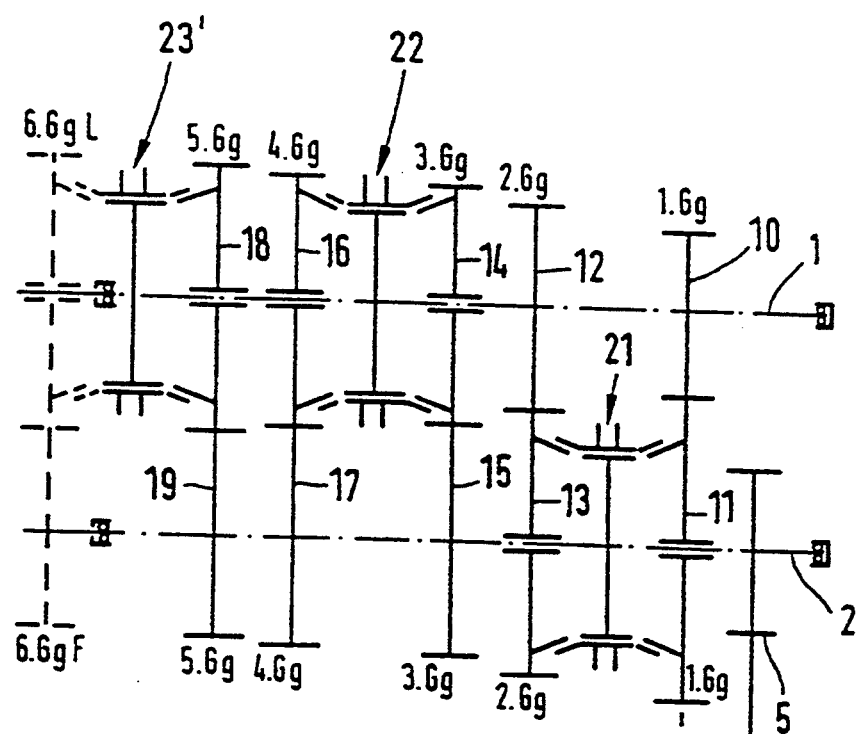
FIG.3
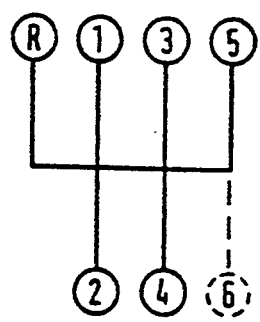
FIG.4
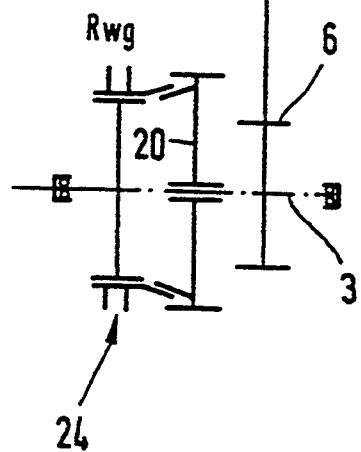

MULTISPEED MANUAL TRANSMISSION FOR MOTOR VEHICLES

FIELD OF THE INVENTION

The invention relates to the field of multispeed transmissions for motor vehicles particularly to manual transmissions of the three-shaft type.

BACKGROUND OF THE INVENTION

Such gearboxes are known, for example, from British Specification 2 074 669 and European Patent 0 224 407. They comprise an input shaft carrying fixed gear wheels, and first and second driven shafts, each shaft carrying loose gear wheels, all these shafts being rotatably mounted in a gearbox housing and each of the driven shafts engaging, via a respective fixed final drive pinion, with a driving gear of a differential, which drives front wheel drive shafts through constant velocity joints. Preferably all gears, including the reverse gear, are synchronized by couplers arranged adjacent to the loose gear wheels.

In the known multispeed change-speed gearboxes of the three-shaft type, an additional reverse gear shaft or axle is necessary in order to effect reversal of the direction of rotation for the reverse gear, so that the gearbox itself includes four shafts.

From German Patent 33 20 494 a multispeed change-speed gearbox for motor vehicles is known. That transmission is a gearbox of the two-shaft type, in which both the input shaft and the driven shaft carry fixed and loose gear wheels. The loose gear wheel of the reverse gear ratio is carried on a third shaft which, however, does not constitute a driven shaft.

In this known change-speed gearbox, reversal of the direction of rotation required for the reverse gear ratio is effected by meshing the loose gear wheel of the first gear, which is in mesh with the fixed gear wheel of the first gear, with the loose gear wheel of the reverse gear. In order to transmit the reversed driving torque of the reverse gear to the driven shaft, a further loose gear wheel for the reverse gear is required on the third shaft, and is meshed with a loose gear wheel of another gear on the input shaft. This latter loose gear wheel in turn meshes with its corresponding fixed gear wheel on the driven shaft, from which the driving torque is transmitted by way of the drive pinion to the differential.

The known change-speed gearbox has the disadvantage that providing two adjacent loose gear wheels required on the third shaft for the reverse gear increases the cost of manufacture and the space needed, and that the multiplicity of fixed and loose gear wheels of two forward gears that are involved in forming the reverse gear train have to be taken into account in designing the reverse gear. Thus, for example, the gear ratio of the reverse gear may be changed if, for technical reasons relating to the drive, it is necessary to change the gear ratio of one of the two forward gears involved in forming the reverse gear train.

SUMMARY OF THE INVENTION

It is an object of the invention to provide a combination of a multispeed change-speed gearbox of the two-shaft type and a change-speed gearbox of the three-shaft type in which no additional fourth shaft is necessary for the synchronized reverse gear.

To this end, the invention provides a multispeed change-speed gearbox for motor vehicles comprising, rotatably mounted in a gearbox housing, an input shaft carrying fixed gear wheels and loose gear wheels, a first driven shaft carrying loose gear wheels and fixed gear wheels and a second driven shaft, both the driven shafts engaging, respectively via a first and a second fixed final drive pinion, with a driving gear of a differential that drives front wheel drive shafts by way of constant velocity joints. All gears, including the reverse gear are synchronized. The fixed gear wheels for the first and second gears are carried on the input shaft. The loose gear wheels for the first and second gears, together with the associated double-acting synchronizing means interposed between them, are carried on the first driven shaft. The second driven shaft carries, adjacent to the second final drive pinion, a loose gear wheel for the reverse gear with a single-acting synchronizing means, said loose gear wheel for the reverse gear meshing with the loose gear wheel of the first gear carried on the first driven shaft adjacent to the first final drive pinion.

This arrangement has the advantage that only the gear ratio of the first gear needs to be taken into consideration in designing the gear ratio of the reverse gear. Because the reverse gear is in the low gear ratio torque delivery path, it is highly stressed. Reverse gear is located in the front part of the gearbox housing, where its high stiffness provides high resistance to the applied forces.

It is also possible to realize the concept of the gearbox by forming the reverse gear by engagement with the loose gear wheel of any other gear on a driven shaft. In particular the loose gear wheel for the reverse gear may be spaced from the final driven pinion on the second driven shaft and mesh with the loose gear wheel of the second gear carried on the first driven shaft and spaced from the final drive pinion on that shaft.

Such an arrangement and design of the synchronized reverse gear is possible both in a four-speed change-speed gearbox, in a five-speed change-speed gearbox (as shown in FIG. 1) and in a six-speed change-speed gearbox (as shown in the gear diagram of FIG. 3).

Such an arrangement of the reverse gear is thus independent of the number of gears that can be selected, so that it can be used for all change-speed gearboxes of the same or similar basic design.

BRIEF DESCRIPTION OF THE DRAWINGS

The invention will now be described in more detail, by way of example, with reference to an embodiment shown in the drawings, in which

FIG. 3 is a schematic view of the five-speed transmission of FIG. 1 having an extension for forming a six-speed gearbox.

FIG. 4 is a gate diagram showing the five-speed positions of the gear shift lever, In FIG. 1 only those parts that are necessary for an explanation of the invention are provided with reference symbols, In FIG. 3 the symbols 1–6 denote 1st–6th gears and R denotes reverse gear.

DESCRIPTION OF THE PREFERRED EMBODIMENT

Figure 1:
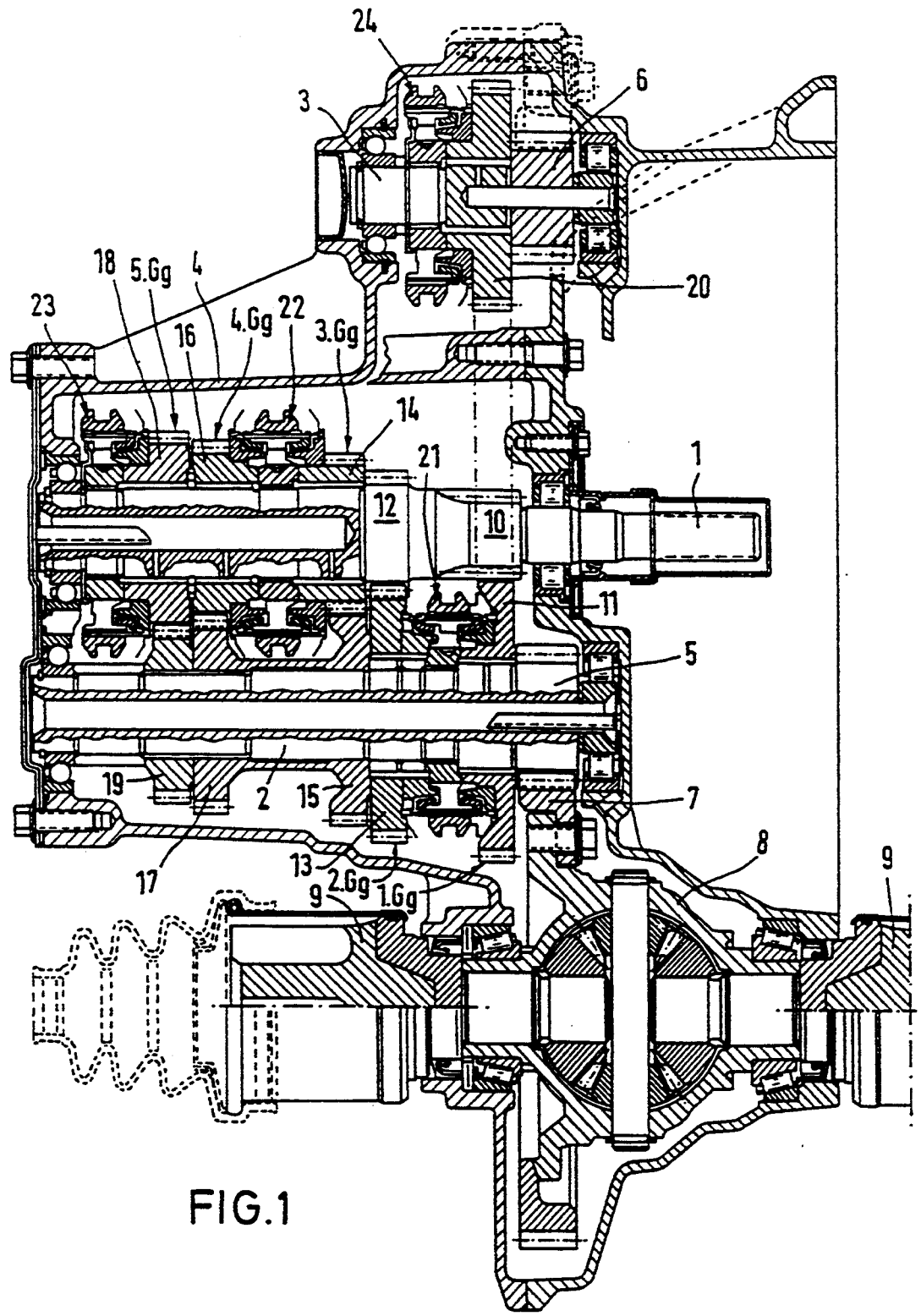
FIG. 1 is a longitudinal cross-section evolution of a five-speed manual transmission having a synchronized reverse gear in accordance with the invention.

An input shaft 1 carries fixed and loose gear wheels of the gearbox; a first driven shaft 2 and a second driven shaft 3 carry further fixed and loose gear wheels of the gearbox, which mesh with corresponding loose and fixed gear wheels supported on the input shaft 1. The input shaft 1 and the two driven shafts 2 and 3 are rotatably mounted in a gearbox housing 4 in the usual manner in suitable bearings, e.g. in the form of roller bearings.

The two driven shafts 2 and 3 carry fixed final drive pinions 5 and 6, both of which mesh with a driving gear 7 of a differential 8 that drives front wheel drive shafts (not shown) by way of constant velocity joints 9.

The input shaft 1 carries on its input end the fixed gear wheels 10 and 12, and the first driven shaft 2 carries on its output end the loose gear wheels 11 and 13 for the first and second gear ratios. These are followed on the input shaft 1 by the loose gear wheels 14 and 16 and on the first driven shaft 2 by the fixed gear wheels 15 and 17 for the third and fourth gear ratios. Thereafter, the input shaft 1 carries the loose gear wheel 18, and the first driven shaft 2 carries the fixed gear wheel 19 for the fifth gear ratio.

A loose gear wheel 20 for the reverse gear is arranged on the second driven shaft 3.

Arranged on the first driven shaft 2 between the loose gear wheels 11 and 13 for the first and second gear ratios is their double-acting synchronizer 21. In a similar manner, arranged on the input shaft 1 between the loose gear wheels 14 and 16 for the third and fourth gears, is their double-acting synchronizer 22. Adjacent the loose gear wheel 18 for the fifth gear ratio and adjacent the loose gear wheel 20 for the reverse gear are respectively a single-acting synchronizer 23 on the input shaft 1 and a synchronizer 24 on the second driven shaft 3.

By operation of the respective synchronizers 21, 22, 23 or 24, each of the adjoining loose gear wheels is connected to the shaft that carries it, in order to produce the corresponding selected gear.

Figure 2:
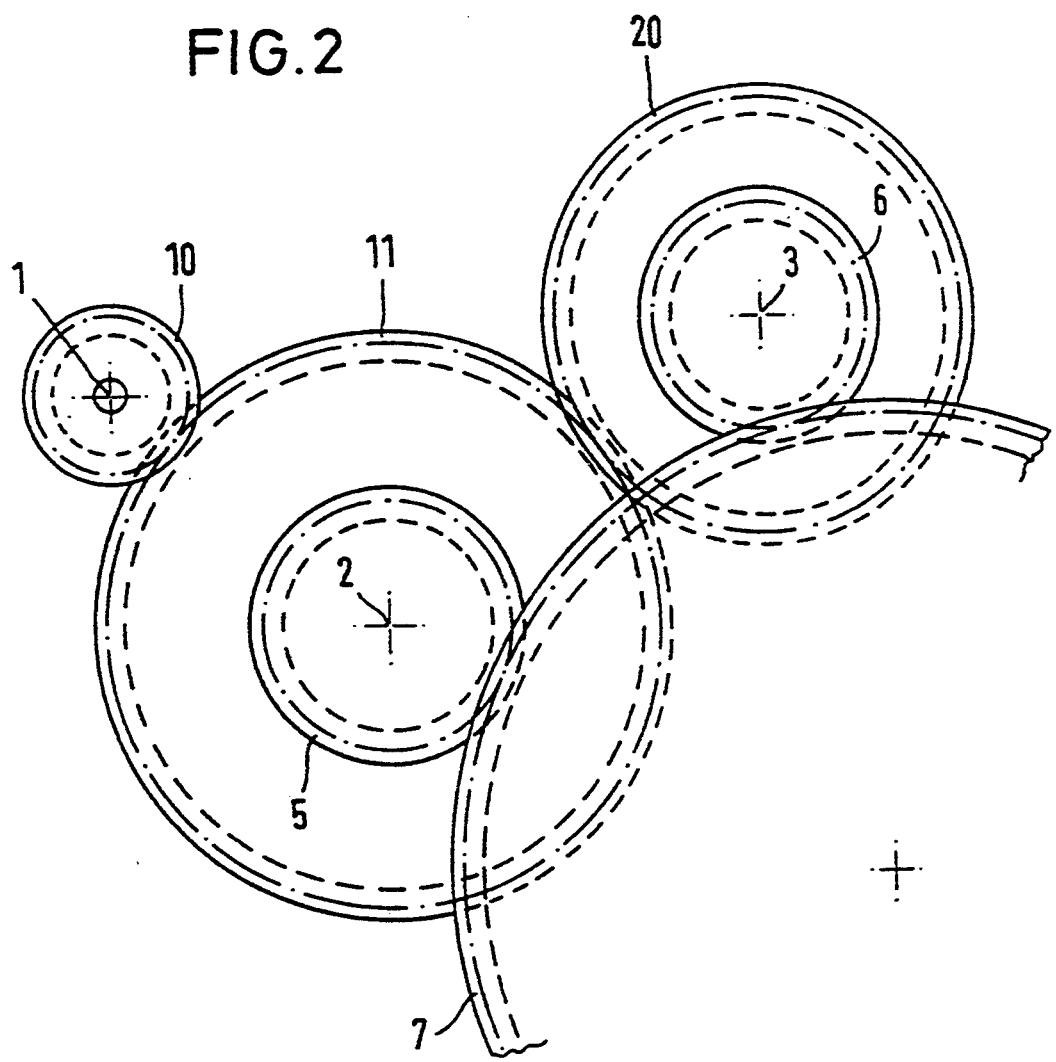
FIG. 2 shows the position of the shafts and of the gear wheels forming the reverse gear of the transmission of FIG. 1.

In FIG. 2 the position of the three shafts of the change-speed gearbox is shown. The gear wheels that form the torque delivery path for reverse gear and of the final drive are indicated by their tip, pitch and root circles.

The fixed gear wheel 10 for the first gear is formed on the input shaft 1. The loose gear wheel 11 for the first gear ratio is journaled freely rotatably on the first driven shaft 2. A first final drive pinion 5 is formed integrally on the first driven shaft 2. A second final drive pinion 6 is similarly formed integrally on the second driven shaft 3, which also carries rotatably mounted on it a loose gear wheel 20 for the reverse gear.

Power transmission in reverse gear takes place from the input shaft 1 by way of the fixed gear wheel 10 to the loose gear wheel 11. The loose gear wheel 20 of the reverse gear is in mesh with this loose gear wheel 11 of the first gear ratio and is also connected through its synchronizer 24 to the second driven shaft 3. Accordingly, the second final drive pinion 6 transmits the reverse rotation of the reverse gear to the drive gear wheel 7 of the differential 8.

The direct engagement of the loose gear wheel 20 of the reverse gear with the loose gear wheel 11 of the first gear is indicated in FIG. 1 by chain lines.

In FIG. 3 a gearing diagram of the five-speed change-speed gearbox of the invention is shown, having an extension of the gearbox to form a six-speed gearbox indicated in broken lines. The input shaft 1, the driven shafts 2 and 3 and the final drive pinions 5 and 6 are shown, as well as the driving gear 7 for the differential. Likewise, the fixed and loose gear wheels of the first to fifth gear ratios and the reverse gear are given the same reference symbols as in FIG. 1.

For the sixth gear ratio formed as an add-on unit, the corresponding loose gear wheel 30, journaled on shaft 1, is indicated. Fixed gear wheel 32 is carried on shaft 2, as shown.

For a gearbox of the type described above, the shift lever position diagram may be of the form shown in FIG. 4.

The multispeed change-speed gearbox according to this invention has with it the advantage that the five-speed transmission can be extended in a relatively simple manner to a six-speed transmission by adding gear wheels 30 and 32 and replacing synchronizer 23 with a double-acting synchronizer.

I claim:

1. A multiple speed transmission for automotive vehicles, comprising:
   an input shaft rotatable supporting first and second pinions fixed to said shaft, third and fourth pinions journaled on said shaft;
   first synchronizer means for selectively, driveably connecting the third and fourth pinions to the input shaft;
   a first driven shaft disposed parallel to the input shaft, rotatably supporting first and second gears journaled thereon and meshing with the first and second pinions, respectively, third and fourth gears fixed to said first driven shaft and meshing with the third and fourth pinions, respectively, and a first final drive pinion;
   second synchronizer means for selectively, driveably connecting the first and second gears to the first driven shaft;
   a second driven shaft disposed parallel to the input shaft, rotatably supporting a reverse gear meshing with the first gear, and a second final drive pinion;
   third synchronizer means for selectively, driveably connecting the reverse gear to the second driven shaft; and
   a final drive gear meshing with the first and second final drive pinions.

2. The transmission of claim 1 further comprising:
   first and second axle shafts; and
   differential means for driving said first and second axle shafts including an input driven by the final drive gear and an output driveably connected to the first and second axle shafts.

3. The transmission of claim 1 further comprising:
   a fifth pinion rotatably supported on the input shaft;
   a fifth gear rotatably fixed to the first driven shaft and meshing with the fifth pinion; and
   fourth synchronizer means for selectively driveably connecting the fifth pinion and the input shaft.

4. The transmission of claim 3 further comprising:
   a sixth pinion rotatably supported on the input shaft; and
   a sixth gear rotatably fixed to the first driven shaft and meshing with the sixth pinion.

5. An automotive transmission for producing multiple gear ratios, comprising:

an input shaft rotatable supporting first and second pinions fixed to said input shaft, spaced along the length of the input shaft, said first and second pinions corresponding to the first and second gear ratios, third and fourth pinions journaled on said shaft, spaced along the length of the input shaft, said pinions corresponding to the third and fourth gear ratios, respectively, and a reverse pinion;

first synchronizer means for selectively, driveably connecting the third and fourth pinions to the input shaft;

a first driven shaft disposed parallel to the input shaft, rotatably supporting first and second gears journaled thereon and meshing with the first and second pinions, said first and second gears corresponding to the first and second gear ratios, respectively, and third and fourth gears fixed to said first driven shaft and meshing with the third and fourth pinions, said third and fourth gears corresponding to the first and second gear ratios, respectively, and a first final drive pinion;

second synchronizer means for selectively, driveably connecting the first and second gears to the first driven shaft;

a second driven shaft disposed parallel to the input shaft, rotatably supporting a reverse gear meshing with the first gear, and a second final drive pinion;

third synchronizer means for selectively, driveably connecting the reverse gear to the second driven shaft; and a final drive gear meshing with the first and second final drive pinions.

6. The transmission of claim 5 further comprising:
first and second axle shafts; and
differential means for driving said first and second axle shafts including an input driven by the final drive gear and an output driveably connected to the first and second axle shafts.

7. The transmission of claim 5 further comprising:
a fifth pinion rotatably supported on the input shaft, corresponding to the fifth gear ratio and spaced from the other pinions on the input shaft;
a fifth gear rotatably fixed to the first driven shaft and meshing with the fifth pinion; and
fourth synchronizer means for selectively driveably connecting the fifth pinion and the input shaft.

8. The transmission of claim 5 further comprising:
a sixth pinion rotatably supported on the input shaft, corresponding to the sixth gear ratio and spaced from the other pinions on the input shaft; and
a sixth gear rotatably fixed to the first driven shaft and meshing with the sixth pinion.

* * * * *